(12) United States Patent
Scheibe et al.

(10) Patent No.: US 6,595,008 B2
(45) Date of Patent: Jul. 22, 2003

(54) PROCESS FOR THE SAFE STORAGE OF SODIUM PERCARBONATE IN BULK CONTAINERS

(75) Inventors: Michael Scheibe, Hanau (DE); Dietmar Träumer, Rodenbach (DE); Rainer Kohlen, Wehrheim (DE); Wolfgang Leonhardt, Frankfurt (DE); Lothar Kaiser, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/023,902

(22) Filed: Dec. 21, 2001

(65) Prior Publication Data

US 2002/0092309 A1 Jul. 18, 2002

(30) Foreign Application Priority Data

Dec. 22, 2000 (DE) .......................... 100 64 821

(51) Int. Cl.[7] .................. F25D 25/00; F25D 17/04; F26B 7/00; F26B 21/08
(52) U.S. Cl. ................ 62/62; 62/186; 34/428; 34/557
(58) Field of Search ............... 62/62, 186, 93; 34/428, 434, 557

(56) References Cited

U.S. PATENT DOCUMENTS

| | | | | |
|---|---|---|---|---|
| 3,581,514 A | * | 6/1971 | Hamerski et al. | 34/428 |
| 4,179,394 A | | 12/1979 | Dillenburg et al. | |
| 4,247,989 A | * | 2/1981 | Steffen | 250/339.14 |
| 4,702,019 A | * | 10/1987 | Tsuruno et al. | 34/168 |
| 5,152,961 A | | 10/1992 | Reginato et al. | |
| 6,268,012 B1 | * | 7/2001 | Sikora et al. | 426/465 |
| 6,289,606 B2 | * | 9/2001 | Gillette et al. | 34/165 |

FOREIGN PATENT DOCUMENTS

| EP | 0 396 175 B1 | 8/1993 |
|---|---|---|
| JP | A-57-42510 | 3/1982 |

* cited by examiner

Primary Examiner—William C. Doerrler
(74) Attorney, Agent, or Firm—Oblon, Spivak, McClelland, Maier & Neustadt, P.C.

(57) ABSTRACT

A process is provided for the safe storage of sodium percarbonate in a bulk container that is substantially closed to the ambient atmosphere. A temperature is measured at at least one position inside the sodium percarbonate stored in bulk and, with an increase in temperature within the range of 0.5 to 10° C. per day, in particular 1 to 5° C. per day, dry air is passed periodically or continuously through the bulk material until the increase in temperature has fallen to a value of less than 1° C. per day in particular less than 0.5° C. per day.

28 Claims, 7 Drawing Sheets

PROCESS FOR THE SAFE STORAGE OF SODIUM PERCARBONATE IN BULK CONTAINERS

BACKGROUND OF THE INVENTION

1. Field of the Invention

This invention relates to a process for the safe storage of sodium percarbonate in a bulk container that is substantially closed to the ambient atmosphere.

2. Description of the Background

The storage of sodium percarbonate ($Na_2CO_3 \cdot 1.5H_2O_2$) in bulk containers, such as stationary and transportable bulk containers, silo works and bunkers for bulk material, requires particular attention to the issue of safety, because sodium percarbonate can decompose spontaneously. The capacity of sodium percarbonate to spontaneously decompose during storage in a silo can lead to heating of the product and uncontrolled thermal decomposition. Sodium percarbonate decomposes in an exothermic reaction to form soda, water and oxygen. The present inventors have found that silo storage conditions, particularly elevated storage temperatures, can lead to a rapid rise in temperature and maximal temperatures of 150 to 180° C. at the end of the decomposition reaction.

It is known that sodium percarbonate can be coated with one or more stabilizing covering layers in order to stabilize the product in the presence of detergent components, such as zeolites. However, this covering has only a limited influence on the capacity of sodium percarbonate to spontaneously decompose. In connection with the process according to the invention, the term sodium percarbonate therefore includes both uncoated sodium percarbonate that has been produced by any process, for example, by a crystallisation process or a fluid-bed spray-granulation process, and sodium percarbonate that has been coated with one or more stabilizing covering layers, the covering layers possibly containing one or more stabilizing components such as, for example, alkali sulfates, sodium carbonate, sodium bicarbonate, waterglass, borates and perborates, magnesium sulfate, and magnesium salts of carboxylic acids.

JP-A-57-42510 discloses a process for storing sodium percarbonate in which cooling air at a temperature not exceeding normal room temperature is passed into the storage container at a relative humidity of at most 70% and, while the sodium percarbonate particles are being cooled, the atmosphere in the storage container is at the same time replaced by the cooling air. The aim of this process is to stabilize the sodium percarbonate, which is transferred at elevated temperature from a dryer into the storage container and is thus contained in an atmosphere having a high relative humidity of air. The contents of the silo are cooled by the passage of cooling air through the product stored in the silo and at the same time the water content is decreased. In this way the storability is increased and the tendency to agglomerate is lessened. However, from this document no suggestions can be inferred as to how sodium percarbonate can be stored for a long period of time in a large silo without posing a safety hazard. Evidently, the problems associated with the spontaneous decomposition of sodium percarbonate in a bulk container, with the liberation of heat, were not known and accordingly no solution to the problem was proposed.

EP Patent 0 396 175 B1 is directed towards a process for preserving sodium perborate monohydrate particles, which are stored in bulk in an impermeable chamber at a temperature of between 10 and 65° C. Here, dry air is passed through the stored material throughout the entire storage period. The dew point of the dry air in this case is to be in particular below −20° C. and the quantity of dry air is to be between 1 and 8 Norm·m³/(h·$t_{NaPB}$). This document contains no suggestion that the process may also be transferred to the storage of sodium percarbonate in a silo. The disadvantages of this process are that, throughout the entire storage period, a large quantity of dry air having a very low dew point has to be passed through the stored material.

As used herein, the term "N" is an abbreviation for "Norm" and means "at standard conditions" of 1013 mbar and 20° C. The term "m" stands for "meters", the term "h" stands for "hours", and the term "$t_{NaPc}$" stands for tons of sodium percarbonate, NaPc.

SUMMARY OF THE INVENTION

The present invention provides a process for the safe storage of sodium percarbonate, including coated sodium percarbonate, in bulk containers, in particular in large silo works. The process makes it possible to economically maintain the stability of sodium percarbonate as constant as possible during storage, to avoid critical storage conditions caused by spontaneous heating inside the storage container, and to reliably bring these conditions under control should they arise.

The inventive process, which allows for the safe storage of sodium percarbonate in a bulk container that is substantially closed to the ambient atmosphere, is characterized in that the temperature is measured at at least one position inside the sodium percarbonate stored in bulk and with an increase in temperature within the range of 0.5 to 10° C. per day, in particular 1 to 5° C. per day, dry air is passed periodically or continuously through the bulk material at least until the increase in temperature has fallen to a value of less than 1° C. per day, in particular less than 0.5° C. per day.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

The inventive process is suitable for the storage of uncoated sodium percarbonate as well as of sodium percarbonate coated with one or more covering layers. The sodium percarbonate is generally stored at an average storage temperature of below 40° C., in particular at 15 to 30° C. A storage temperature of above 40° C. is less suitable, as in this case the quantity of dry air has to be increased and/or its dew point has to be lowered, thereby decreasing the economic efficiency of the process. At a storage temperature of below 15° C. it can be guaranteed that there will be no condensation phenomena nor, as a result of these, an accelerated spontaneous heating inside the storage container.

The storage containers may be stationary or transportable, vertically or horizontally arranged storage containers, such as bunkers and silos. The volume of the storage containers is usually more than 10 m$^3$. Preferably, the storage containers are vertically standing silos having a bulk material capacity within the range of 10 to 250 m$^3$. The dry air to be passed through the storage container is introduced at one side, in the lower region in the case of vertical storage containers, by means of one or more feed devices and, after passage through the stored material, is led away at the opposite side.

Inside the bulk of the stored material, a temperature measurement is taken at at least one position, but preferably at several positions, among them at least two central positions at different levels in the bulk container, as different temperature gradients may develop both horizontally and vertically. The measurement of the increase in temperature per unit of time is used for controlling the connection and disconnection as well as for regulating the quantity of the dry air.

The temperature of the dry air to be passed through the bulk material will usually be around or below the set storage temperature. Accordingly, it is advantageous to use dry air at a temperature within the range of 15 to 30° C. The dew point temperature of the dry air is preferably within the range of −20° C. to +5° C. A dew point temperature outside this range is feasible. However, the cost of producing dry air having a dew point temperature below −20° C. is significantly higher. On the other hand, at a dew point temperature above +5° C. the quantity of air has to be significantly increased in order to avoid critical storage conditions or reliably bring them under control.

In a preferred and particularly economic embodiment of the process, with an increase in temperature of 0.5 to 2° C. per day and an average storage temperature of below 25° C., a specific quantity of dry air of less than 0.2 Norm·m$^3$/(h·t$_{NaPc}$), having a dew point temperature τ of −20° C., is passed through the stored material. At an average storage temperature in the range of 25 to 30° C. and the same dew point temperature, a quantity of dry air within the range of 0.1 to 0.3 Norm·m$^3$/(h·t$_{NaPc}$) is passed through the bulk material. As soon as the desired set storage temperature has again been attained, the passage of dry air can be discontinued. If dry air having a dew point temperature of greater than −20° C. is used, the quantity of dry air is increased by 0.01 to 0.02 Norm·m$^3$/(h·t$_{NaPc}$) for each ° C. increase in the dew point above 20° C.

Surprisingly, the inventive process enables sodium percarbonate to be stored safely even in large silo containers through the procedure whereby, in the event of a measurable rise in temperature caused by spontaneous decomposition, dry air is passed through the stored material until the increase in temperature has again fallen below the set limiting value, in particular to less than 0.5° C. per day.

Surprisingly, a low specific quantity of dry air is sufficient to ensure safe storage. In contrast to the process according to the invention, namely, in the process previously considered in EP-Patent 0 396 175, it was necessary to pass dry air through the stored material throughout the entire storage period. The small quantity of dry air in the process according to the invention is also surprising compared with the process relating to the storage of sodium perborate monohydrate, because critical storage conditions in the case of the storage of sodium percarbonate, unlike in the case of sodium perborate monohydrate, cannot be brought under control by melting the product. Moreover, the autocatalytic behavior of sodium percarbonate is also to be regarded as considerably more critical than that of sodium perborate monohydrate.

Figure 5:
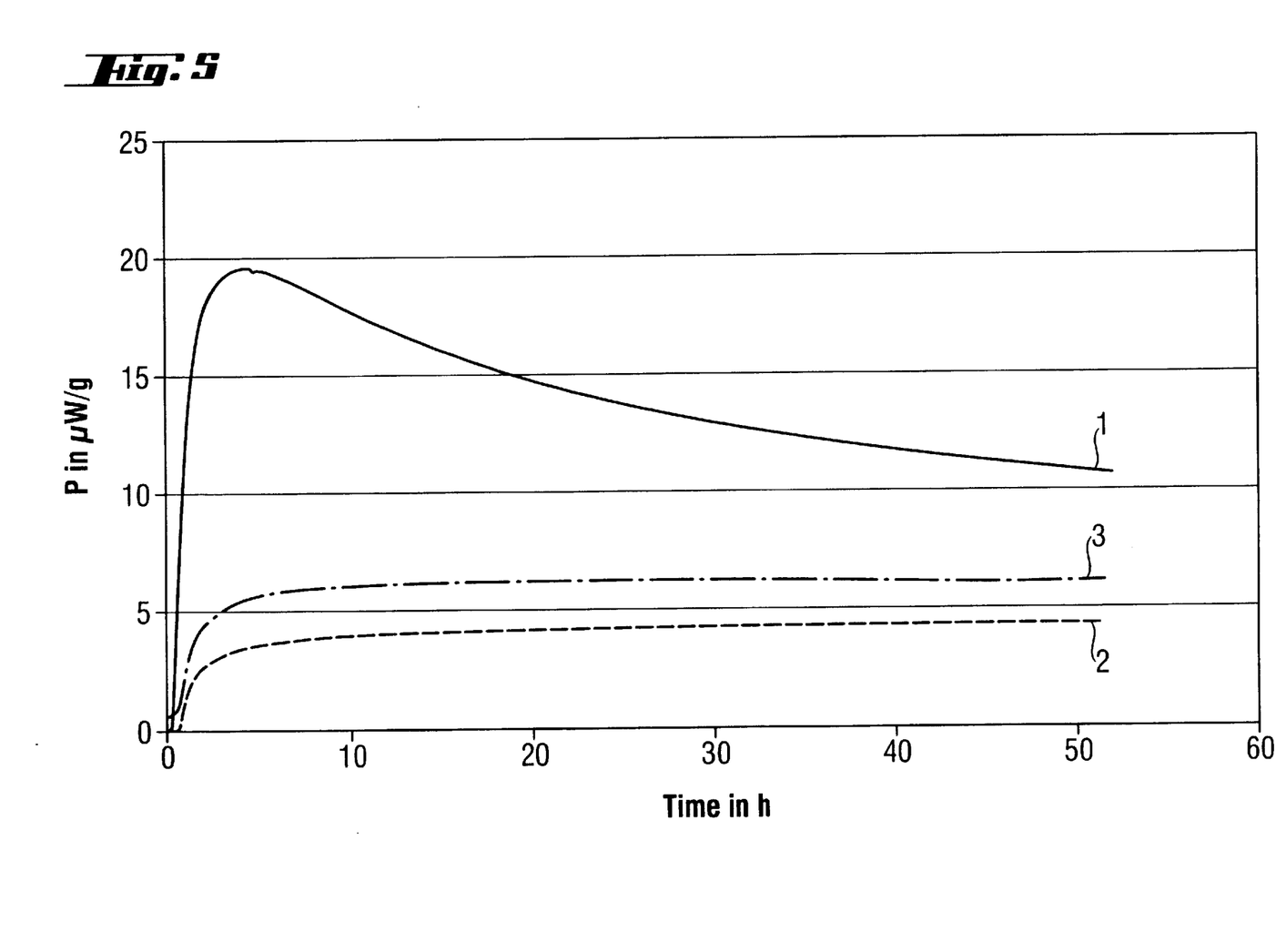
FIG. 5 compares the thermal output from sodium perborate monohydrate and sodium percarbonate samples in a determination of the TAM value at 40° C.
Figure 6:
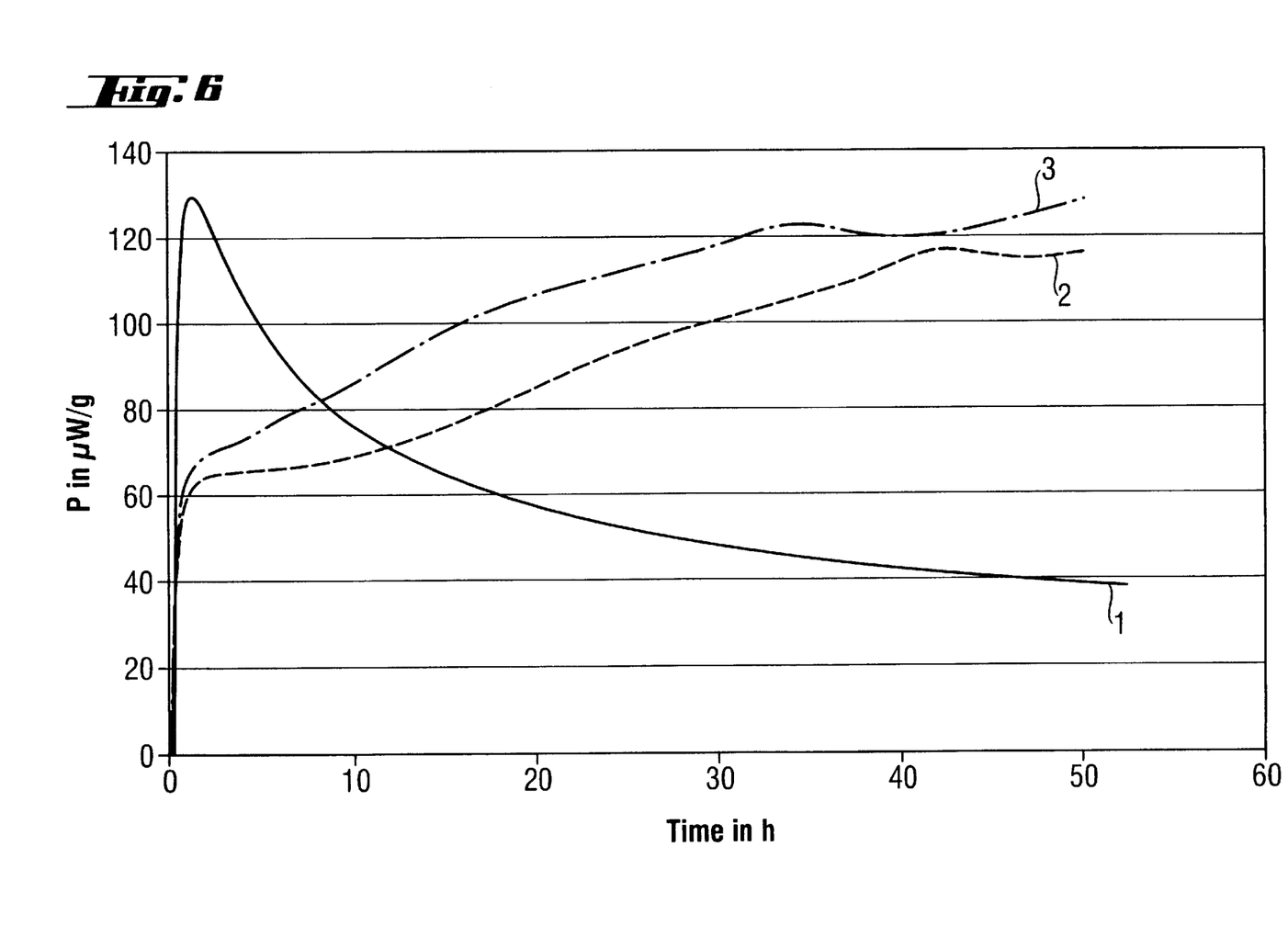
FIG. 6 compares the thermal output from sodium perborate monohydrate and sodium percarbonate samples in a determination of the TAM value at 60° C.
Figure 7:
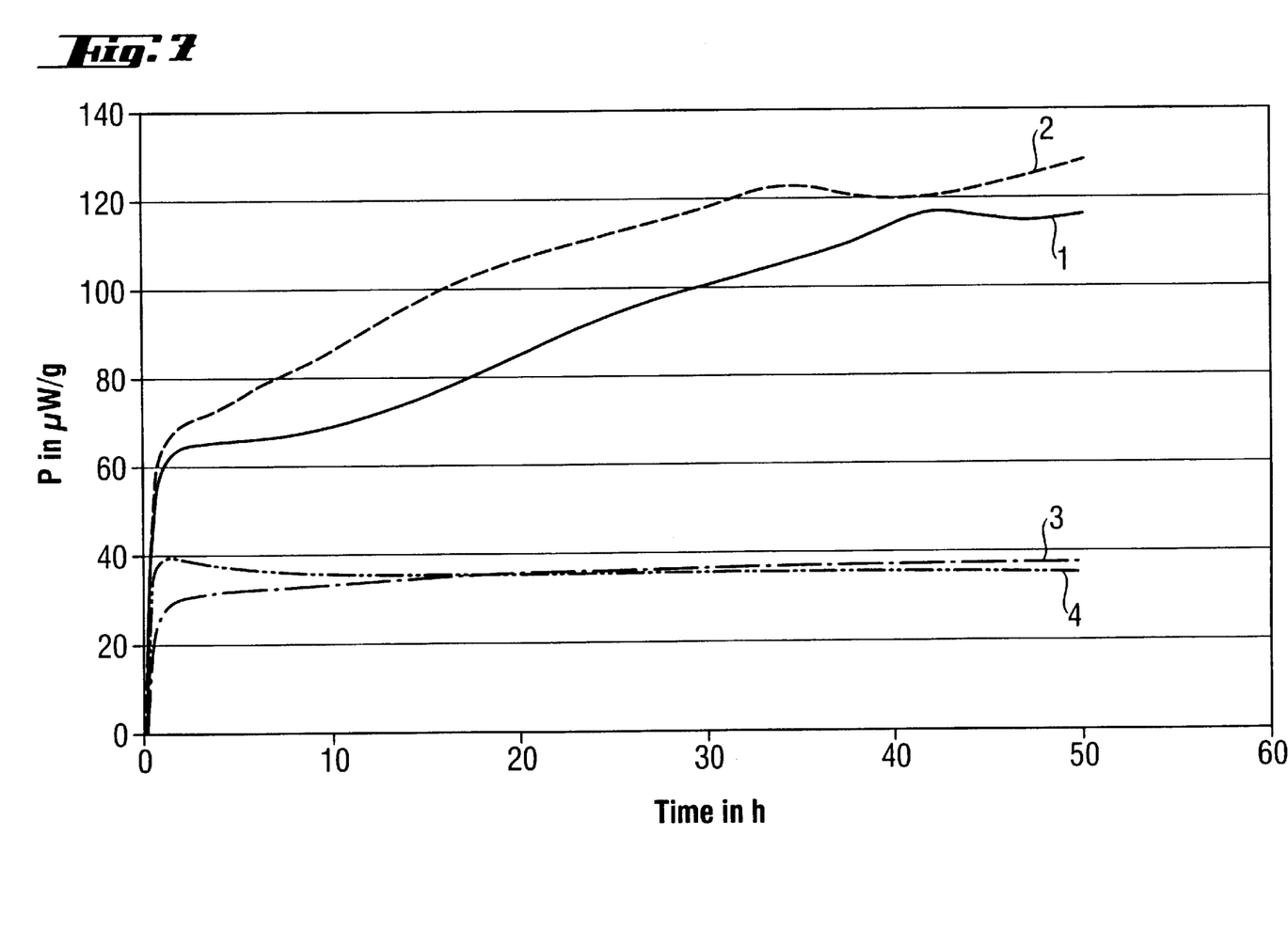
FIG. 7 shows compares the thermal output from sodium percarbonate samples before and after storage in a determination of the TAM value at 60° C.

It was also found that the internal stability of sodium percarbonate is significantly increased during storage in a silo at elevated temperature but with simultaneous passage through of dry air for the purpose, according to the invention, of limiting the increase in temperature. This surprising effect is manifested by a decrease in the so-called TAM (thermal activity monitor) value. The TAM value indicates a specific thermal output produced by the material, in this case sodium percarbonate, at the given temperature. The internal stability of sodium percarbonate can be represented as a TAM value, according to which the stability increases with decreasing TAM value. A good storage life is indicated by a low TAM value. The TAM value is a microcalorimetric determination of the energy released during storage, measured by means of the TAM® Thermal Activity Monitor from Thermometric AB, Jarfalla (Sweden). The TAM features four measuring cylinders, each containing a pair of measuring cups sandwiched between a pair of Peltier thermopile heat sensors. The cylinders are surrounded by an infinite heat sink: a water bath that can be maintained at a temperature. The thermopile heat sensor elements of the two measuring cups in each cylinder are connected in series but in opposition, so that the resultant signal represents the difference in heat flow from the two cups. One contains the sample and the other contains a reference. As the sodium percarbonate degrades, it gives off heat and tries to restore thermal equilibrium with the water bath. The flow of this heat is detected, measured, and converted to a TAM value in $\mu$W/g. As the following examples show, the heat production of sodium percarbonate after storage according to the invention decreases with elevated storage temperature. This finding is shown in FIGS. 5–7, which are discussed in the examples section.

An important advantage of the process according to the invention is that it is possible to store sodium percarbonate even in large storage containers without the hazard of an uncontrolled spontaneous decomposition of the stored material. Critical storage conditions, that is, an excessive rate of temperature increase accompanied by the hazard of a decomposition of the sodium percarbonate, can reliably be brought under control by passing dry air through the stored material. The quantity of air required for this control increases with increasing temperature of the bulk material and elevation of the dew point temperature of the dry air. Where the storage conditions according to the invention are maintained, the quality of the stored sodium percarbonate remains substantially constant over a long period of time. As a result of the passage of dry air, regulated according to need, through the sodium percarbonate stored in the storage container, the moisture in the product is decreased and thus the tendency to decompose is attenuated.

Previously, when sodium percarbonate was stored in a silo strict attention had to be paid to ensure that in the event of an increased rise in temperature the silo could be emptied sufficiently rapidly to avoid a critical situation. In contrast, the inventive process safely stores sodium percarbonate while avoiding the need for a compulsory evacuation.

EXAMPLES 1.1 to 1.4

The process according to the invention and the investigation of the decomposition behavior of sodium percarbonate were carried out in an experimental silo. The silo included a cylindrical length of glass pipe (diameter=0.3 m, height=1 m, wall thickness=ca. 10 mm) and below it a conical air inlet region. The latter and the cylindrical length of pipe were insulated with a layer of mineral wool of 40 mm in thickness.

For each experiment, a load of 75 kg sodium percarbonate was introduced. An aeration floor, through which the contents of the silo could be heated to the required starting temperature by means of hot air, was situated under the bulk material. The controlled supply of dry air during the experiments was likewise effected through the aeration floor. The quantity of dry air was regulated by means of a mass flow governor. The temperatures were monitored by means of several temperature-measuring devices disposed centrally and at different levels in the bulk material (TIR=temperature measuring points).

Example 1.1

Determination of the Starting Temperature at which a Decomposition Accompanied by a Measurable Rise in Temperature Occurs (Not According to the Invention)

Figure 1:
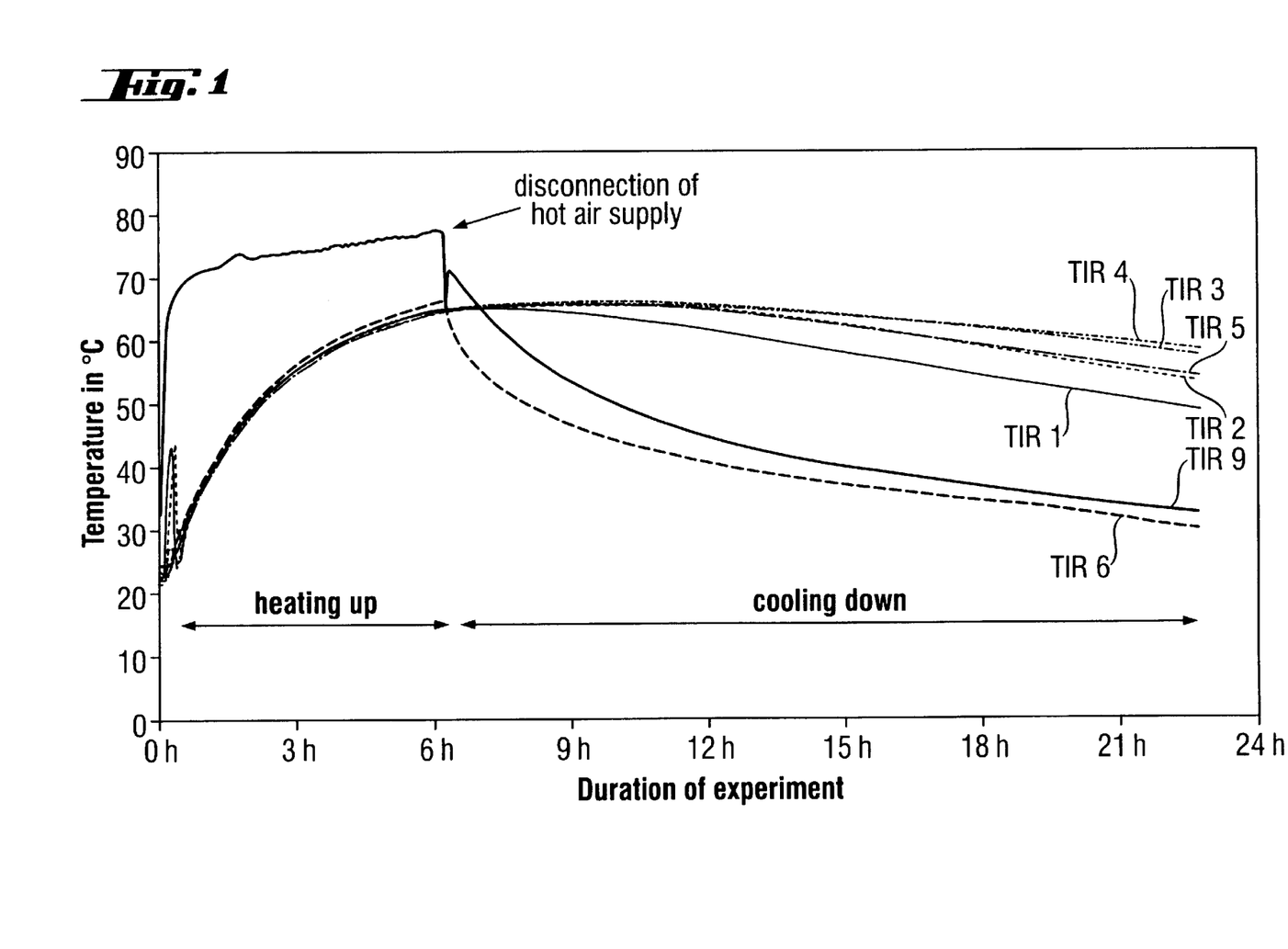
FIG. 1 shows a heating-cooling curve in an experimental silo below a critical starting temperature.

FIG. 1 shows a typical course of a heating-cooling curve. At the end of the heating-up stage (after 6 h) the temperature of the product was about 66° C. After disconnection of the hot air supply, the air inlet region and the uppermost region (TIR 6) cooled down rapidly. The remaining temperature measuring points (TIR 1–5) showed a slower cooling. The initial rise in the temperatures (TIR 2–4) after the disconnection of the hot air supply was attributable to a decomposition of sodium percarbonate. The cooling down of the silo was greater than the heating from decomposition, so that overall the silo cooled down.

Example 1.2

Experiment with Spontaneous Heating and Uncontrolled Decomposition in the Silo (Not According to the Invention)

Figure 2:
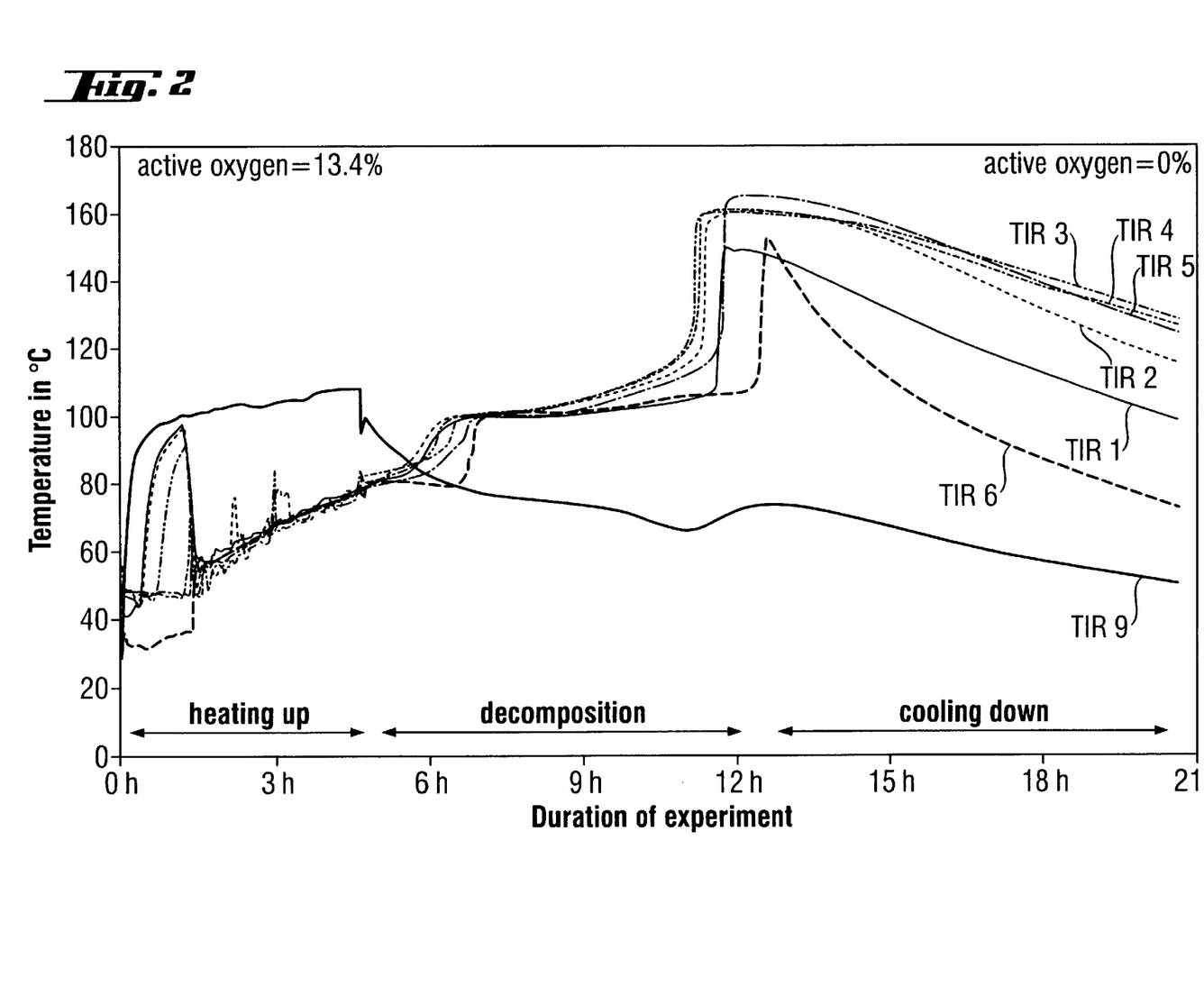
FIG. 2 shows a heating-cooling curve in an experimental silo above a critical starting temperature.

As the heating-cooling curve of FIG. 2 shows, a decomposition accompanied by a rise in temperature is attained at a starting temperature of about 80° C. in the silo (=end of the heating-up period). An incipient spontaneous decomposition first causes a moderate rise in temperature. Then the spontaneous heating accelerates, with a temperature level of about 100° C. being attained. Owing to the evaporation of water, the rise in temperature slows for a period of time. Then, after about 12 h the actual decomposition temperature of 160° C. is attained very rapidly. The Oa content (active oxygen content) fell from 13.4% to 0%.

Example 1.3

Storage According to the Invention, with Passage through of Dry Air

Figure 3:
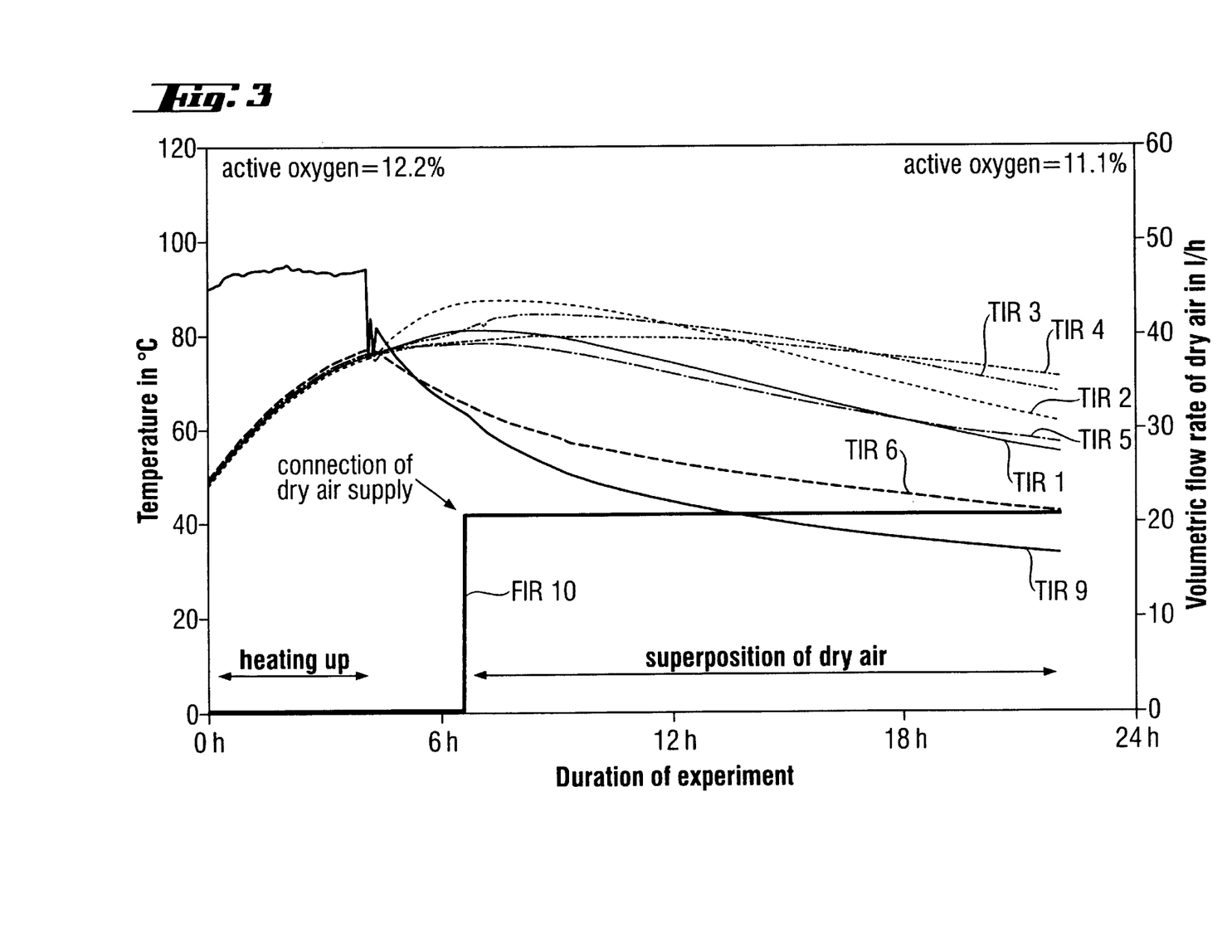
FIG. 3 shows a heating-cooling curve in an experimental silo for storage according to the invention using dry air having a dew point temperature τ=−20° C.

FIG. 3 shows a heating-cooling curve in which, in order to avoid a runaway in the silo, dry air having a dew point temperature −20° C. was passed in a quantity of 20 Norm·1/h through the 75 kg load of sodium percarbonate in the silo. As FIG. 3 shows, at the end of the heating-up period and before commencement of the passage of dry air, there was still a further rise in temperature at several of the temperature measuring points (in particular TIR. 2) which were disposed in the lowest quarter of the silo. This rise in temperature could definitely be stopped 1–2 hours after commencement of the passage of dry air.

Example 1.4

Storage According to the Invention, using dry air having a dew point of 0° C.

Figure 4:
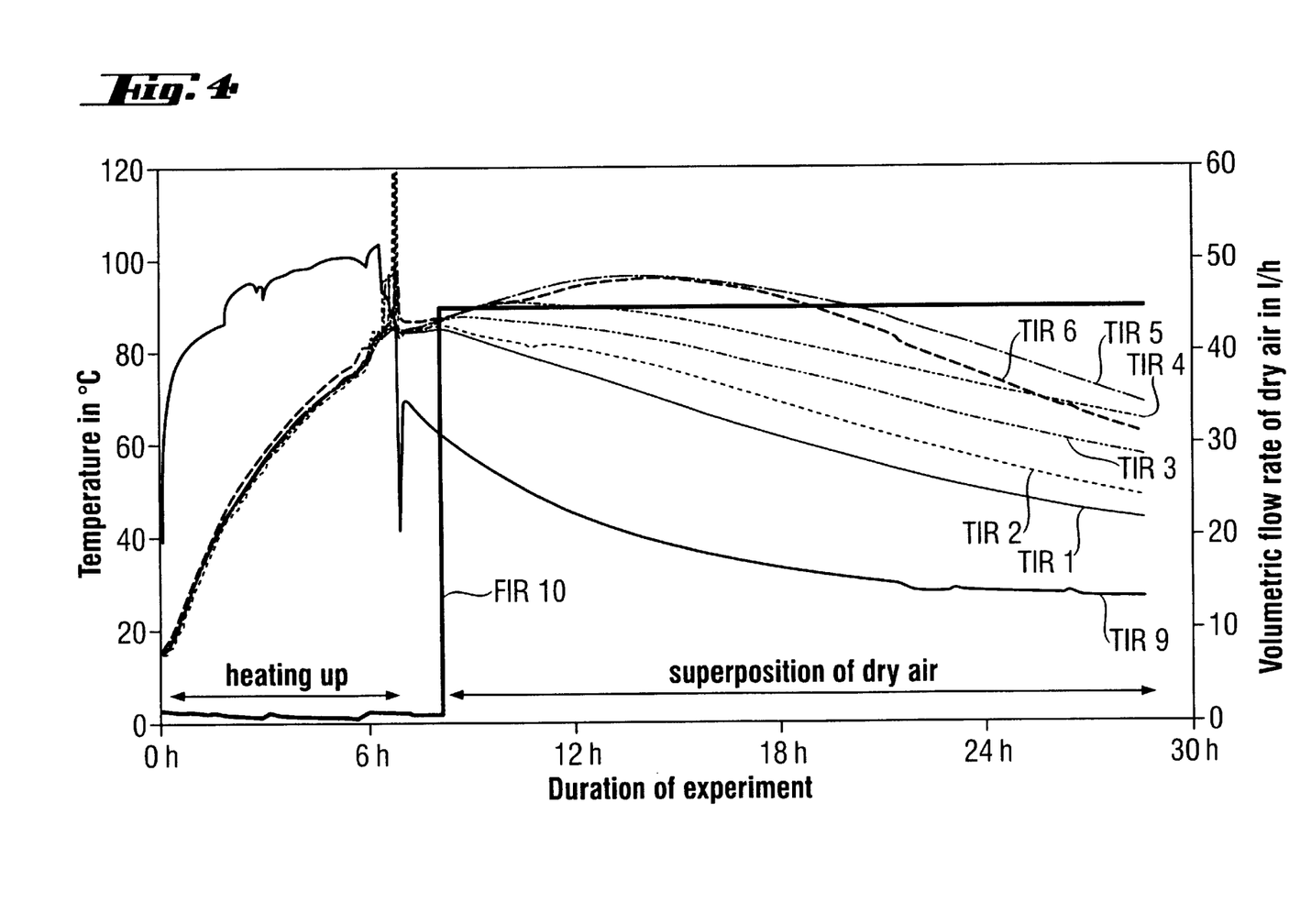
FIG. 4 shows a heating-cooling curve in an experimental silo for storage according to the invention using dry air having a dew point temperature τ=0° C.

FIG. 4 shows the heating-cooling curve in the case of storage according to the invention using dry air having a dew point of 0° C. At the end of the heating-up period, the temperature in the bulk material continued to rise. After commencement of the passage of dry air through the contents of the silo in a quantity of 45 Norm·1/h dry air, the temperature in the center (TIR 4) and in the upper third (TIR 5) first of all continued to rise but then fell again, so that no critical conditions arose. The temperature of the silo contents below the center decreased immediately after commencement of the passage of dry air.

EXAMPLES 2.1 to 2.3

EXAMPLE 2.1

Determination of the TAM Values of Sodium Percarbonate Compared with Sodium Perborate Monohydrate:

FIG. 5 shows curves measured for the TAM determination at 40° C., curve 1 relating to sodium perborate monohydrate and curves 2 and 3 to two samples of sodium percarbonate. The thermal output P of sodium perborate monohydrate at first increases considerably more intensely than that of sodium percarbonate, but then falls again significantly. The thermal output of the two samples of sodium percarbonate remains substantially constant at a lower level after an initial rise.

EXAMPLE 2.2

Determination of the TAM Values of Sodium Percarbonate Compared with Sodium Perborate Monohydrate In FIG. 6, in which the course of the curves for the determination of the TAM values at 60° C. is represented, sodium perborate monohydrate shows a similar course as at 40° C., but at a distinctly higher level. In contrast, however, in the case of sodium percarbonate a constant level is not attained and the thermal output continues to increase after the initial rise. Here, it is apparent that sodium perborate monohydrate is considerably more stable than sodium percarbonate. Consequently, there is a greater hazard potential involved in storing sodium percarbonate in a large storage container, such as a silo. Moreover, the critical starting temperature in large silos is far lower than in the experimental silo. On that account, the storage conditions are to be carefully controlled, which is easily possible through the process according to the invention.

EXAMPLE 2.3

Determination of the TAM Values of Sodium Percarbonate before and after Storage According to the Invention FIG. 7 shows the diagrams of the TAM measurement of the two samples of sodium percarbonate at 60° C., which have already been shown in FIG. 6 (curves 2 and 3 in FIG. 6 correspond to curves 1 and 2 in FIG. 7) as well as TAM curves after storage according to the invention of the corresponding batches of product (curves 3 and 4).

The two samples were stored according to the invention, similarly to Example 1.3, in the silo previously described and, for the purpose of avoiding critical storage conditions, as shown in FIG. 3, dry air at a temperature of 20° C. and a dew point temperature of −20° C. was passed through the silo in a quantity of 20 Norm·1/h. After this storage, TAM values were again determined and these are shown in FIG. 7 as curves 3 and 4.

The course of the curve clearly shows that the internal stability of the sodium percarbonate stored according to the invention is considerably higher than the internal stability of the unstored product. Thus a thermal treatment of sodium percarbonate surprisingly results in an increase in stability.

The disclosure of the priority document, Application No. 100 64 821.5, filed in Germany on Dec. 22, 2000, is incorporated by reference herein in its entirety.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A process for storing sodium percarbonate, the process comprising
   providing sodium percarbonate in a container substantially closed to the atmosphere;
   measuring a temperature at a position inside the sodium percarbonate;
   passing a periodic or continuous flow of air through the container when a rate of increase of the temperature inside the sodium percarbonate is within a range of 0.5 to 10° C. per day; and
   then discontinuing the flow of air through the container when the rate of increase decreases to less than −0.5° C. per day.

2. The process according to claim 1, wherein the flow of air is passed through the container when the rate of increase of the temperature inside the sodium percarbonate is within a range of 1 to 5° C. per day.

3. A process for storing sodium percarbonate, the process comprising
   providing sodium percarbonate in a container substantially closed to the atmosphere;
   measuring a temperature at a position inside the sodium percarbonate;
   passing a periodic or continuous flow of air through the container when the rate of increase of the temperature inside the sodium percarbonate is within a range of 1.0 to 10° C. per day; and
   then the flow of air through the container when the rate of increase decreases to less than 1° C. per day.

4. The process according to claim 1, wherein the providing comprises storing the sodium percarbonate in the container at a storage temperature of below 40° C.

5. The process according to claim 1, wherein the providing comprises storing the sodium percarbonate in the container at a storage temperature in a range of from 15 to 30° C.

6. The process according to claim 1, wherein the temperature is measured at the center of the sodium percarbonate stored in the container.

7. The process according to claim 1, wherein the position where the temperature is measured is a first position inside the sodium percarbonate; and
   the process further comprises measuring the temperature at one or more positions that are inside the sodium percarbonate other than the first position.

8. The process according to claim 1, wherein the air has a dew point temperature within a range from about −20° C. to +5° C.

9. The process according to claim 1, wherein
   the providing comprises storing the sodium percarbonate at a storage temperature below 25° C.;
   the rate of increase of the temperature inside the sodium percarbonate is 0.5 to 2° C. per day;
   the air has a dew point temperature of about −20° C.; and
   the flow of air through the sodium percarbonate is less than 0.2 Norm·m$^3$/(h·t$_{NaPc}$).

10. The process according to claim 1, wherein
    the providing comprises storing the sodium percarbonate at a storage temperature within a range of from 25 to 30° C.;
    the rate of increase of the temperature inside the sodium percarbonate is 0.5 to 2° C. per day;
    the air has a dew point temperature of about −20° C.; and
    the flow of air through the sodium percarbonate is 0.1 to 0.3 Norm·m$^3$/(h·t$_{NaPc}$).

11. The process according to claim 9, wherein
    the air has a dew point temperature τ in a range of from greater than −20° C. to +5° C.; and
    the flow of air through the container per ton of sodium percarbonate and hour is equal to (M (τ+20)+B), where M is a specific flow of air of from 0.01 to 0.02 Norm·m$^3$/(° C.·h·t$_{NaPc}$),
    τ is the dew temperature in ° C., and
    B is a variable flow of air of from greater than 0 to 0.2 Norm·m$^3$/(h·t$_{NaPc}$).

12. The process according to claim 10, wherein
    the air has a dew point temperature τ in a range of from greater than −20° C. to +5° C.; and
    the flow of air through the container per ton of sodium percarbonate and hour is equal to (M (τ+20)+B), where M is a specific flow of air of from 0.01 to 0.02 Norm·m$^3$/(° C.·h·t$_{NaPc}$),
    τ is the dew temperature in ° C., and
    B is a variable flow of air of from 0.1 to 0.3 Norm·m$^3$/(h·t$_{NaPc}$).

13. The process according to claim 1, wherein the container is a silo having an internal volume of at least 10 m$^3$.

14. The process according to claim 1, wherein the container is a vertically standing silo having an internal volume in a range of from 10 to 250 m$^3$.

15. The process according to claim 1, wherein the sodium percarbonate is a granular sodium percarbonate provided with at least one stabilizing covering layer.

16. The process according to claim 3, wherein the flow of air is passed through the container when the rate of increase of the temperature inside the sodium percarbonate is within a range of 1 to 5° C. per day.

17. The process according to claim 3, wherein the providing comprises storing the sodium percarbonate in the container at a storage temperature of below 40° C.

18. The process according to claim 3, wherein the providing comprises storing the sodium percarbonate in the container at a storage temperature in a range of from 15 to 30° C.

19. The process according to claim 3, wherein the sodium percarbonate has a center inside the sodium percarbonate; and the position where the temperature is measured is at the center of the sodium percarbonate.

20. The process according to claim 3, wherein the position where the temperature is measured is a first position inside the sodium percarbonate; and the process further comprises measuring the temperature at one or more positions that are inside the sodium percarbonate other than the first position.

21. The process according to claim 3, wherein the air has a dew point temperature within a range from about −20° C. to +5° C.

22. The process according to claim 3, wherein the providing comprises storing the sodium percarbonate at a storage temperature below 25° C.;

the rate of increase of the temperature inside the sodium percarbonate is 1 to 2° C. per day;

the air has a dew point temperature of about −20° C.; and the flow of air through the sodium percarbonate is less than 0.2 Norm·m$^3$/(h·$t_{NaPc}$).

23. The process according to claim 22, wherein the air has a dew point temperature τ in a range of from greater than −20° C. to +5° C.; and the flow of air through the container per ton of sodium percarbonate and hour is equal to (M (τ+20)+B), where M is a specific flow of air of from 0.01 to 0.02 Norm·m$^3$/(° C.·h·$t_{NaPc}$), τ is the dew temperature in ° C., and B is a variable flow of air of from greater than 0 to 0.2 Norm·m$^3$/(h·$t_{NaPc}$).

24. The process according to claim 3, wherein the providing comprises storing the sodium percarbonate at a storage temperature within a range of from 25 to 30° C.;

the rate of increase of the temperature inside the sodium percarbonate is 1 to 2° C. per day;

the air has a dew point temperature of about −20° C.; and the flow of air through the sodium percarbonate is 0.1 to 0.3 Norm·m$^3$/(h·$t_{NaPc}$).

25. The process according to claim 24, wherein the air has a dew point temperature τ in a range of from greater than −20° C. to +5° C.; and the flow of air through the container per ton of sodium percarbonate and hour is equal to (M (τ+20)+B), where M is a specific flow of air of from 0.01 to 0.02 Norm·m$^3$/(° C.·h·$t_{NaPc}$), τ is the dew temperature in ° C., and B is a variable flow of air of from 0.1 to 0.3 Norm·m$^3$/(h·$t_{NaPc}$).

26. The process according to claim 3, wherein the container is a silo having an internal volume of at least 10 m$^3$.

27. The process according to claim 3, wherein the container is a vertically standing silo having an internal volume in a range of from 10 to 250 m$^3$.

28. The process according to claim 3, wherein the sodium percarbonate is a granular sodium percarbonate provided with at least one stabilizing covering layer.

* * * * *

UNITED STATES PATENT AND TRADEMARK OFFICE
CERTIFICATE OF CORRECTION

PATENT NO. : 6,595,008 B2
APPLICATION NO. : 10/023902
DATED : July 22, 2003
INVENTOR(S) : Michael Scheibe et al.

It is certified that error appears in the above-identified patent and that said Letters Patent is hereby corrected as shown below:

Column 7, lines 39-40, "-0.5°C" should read --0.5° C--

Col. 7 line 56, "the the flow of air" should read --then discontinuing the flow of air--

Signed and Sealed this

Twenty-second Day of August, 2006

JON W. DUDAS
*Director of the United States Patent and Trademark Office*